3,129,253
HYDRATION OF OLEFINS
Raymond C. Odioso, Glenshaw, Bruce K. Schmid, McCandless Township, Allegheny County, and Robert C. Zabor, Glenshaw, Pa., assignors to Gulf Research & Development Company, Pittsburgh, Pa., a corporation of Delaware
No Drawing. Filed July 7, 1958, Ser. No. 746,612
3 Claims. (Cl. 260—641)

This invention relates to catalysts and processes for the hydration of olefins to their corresponding alcohols.

We have now discovered that sulfides of one or more metals selected from the group comprising group VI and group VIII metals are especially useful and economical catalysts for the hydration of olefins. In addition to the fact that the metal sulfide catalysts of this invention possess a high activity for the hydration of olefins, they exhibit the additional advantage of being most active at relatively low temperatures. Low temperatures are important for the retention of catalyst activity since catalyst deactivation occurs most rapidly at high temperatures. A further advantage achieved by employing the catalysts of this invention is the concomitant production of small but useful amounts of ketones and polymers which are valuable and easily separable by-products.

The catalyst compositions of this invention comprise the sulfide or sulfides of at least one metal selected from the group comprising group VI and group VIII metals. Compositions comprising mixtures of group VI metal sulfides and group VIII metal sulfides are preferred catalysts according to this invention. The most preferred catalyst composition is one comprising essentially a group VI metal sulfide, preferably tungsten sulfide. If both group VI and group VIII metals are employed, the atomic ratio of group VI to group VIII metal should be between 0.1:1 and 10:1. The amount of sulfur in the catalyst compositions of this invention should be between 10 and 50 percent of the total catalyst weight.

The sulfur content of the catalysts of this invention should be chemically combined with the active metals to form the sulfide of these metals. The catalysts of this invention are prepared by reacting an ionic solution of the active metals with a suitable sulfur containing compound. According to one method of preparation, the active metal is initially put into aqueous solution as a soluble salt and is then precipitated as a sulfide by passing a sulfur containing compound, such as hydrogen sulfide, through the solution. If desired, two or more metals may be co-precipitated as sulfides by dissolving soluble salts of each of these metals in aqueous solution followed by precipitation with a sulfur containing compound such as hydrogen sulfide. The desired ratio of active metals in the completed catalyst can be controlled by regulating the proportion of salts initially put into solution.

According to the process of this invention a catalyst comprising the sulfide or sulfides of at least one metal selected from the group comprising group VI and group VIII metals is contacted with an olefin-water mixture under hydration conditions of temperature, pressure and olefin-water ratio. The overall temperature range for this reaction should be 250° F. to 600° F. generally. While this temperature range can be employed for any catalyst composition of this invention, when a catalyst comprising essentially group VI metals is employed, the preferred temperature range is 325° F. to 500° F., while the most preferred temperature range for this catalyst is 375° F. to 450° F. When a catalyst comprising essentially group VIII metals is employed, the preferred temperature is 450° F. to 600° F. If the catalyst employed comprises a mixture of the sulfides of metals of group VI and group VIII, the preferred temperature range is 375° F. to 520° F.

A suitable pressure range for the hydration reaction is 500 to 10,000 pounds per square inch gauge or over with a preferred range of 1500 to 4000 pounds per square inch gauge. The molal ratio of water to olefin can vary from about 1:1 to 40:1 or more, and the preferred ratio is 5:1 to 20:1. The process may be carried out in either batch or continuous operation, but is preferably carried out in a continuous manner. Space velocities of 0.25 to 25 volumes liquid olefin per hour per volume of catalyst generally are suitable, but the preferred space velocity range is 0.75 to 5 volumes liquid propylene per hour per volume of catalyst.

The novel hydration catalysts of this invention require relatively low hydration temperatures to achieve high conversions to the alcohol. Low temperature conversions are extremely desirable since high temperatures result in rapid deactivation of the catalyst. At high temperatures the hydration catalysts of this invention lose their sulfur content and thereby become less active for the hydration of olefins. The loss of sulfur from the catalyst at higher temperatures can be compensated by the continuous injection of a sulfur containing compound, such as hydrogen sulfide, into the system during the hydration reaction. Sulfur from the sulfur compound being injected into the system tends to replace whatever sulfur is being lost from the catalyst at the high temperature. While the injection of an extraneous compound such as hydrogen sulfide is required to compensate for loss of sulfur from the catalyst at high temperatures, the relatively low hydration temperatures required by many of the catalysts of this invention can obviate the use of such an extraneous sulfur containing stream. Therefore, the fact that the catalysts of this invention allow high conversions to the alcohol at relatively low hydration temperatures is an especially desirable characteristic and permits the use of our novel catalysts for long throughput intervals before regeneration becomes necessary.

Table 1 illustrates test results obtained by reacting propylene and water over a tungsten disulfide catalyst at various temperatures.

TABLE 1

*Effect of Temperature on Product Distribution in Reaction of Propylene and Water Over Tungsten Disulfide Catalyst*

Pressure: 3675 pounds per square inch gauge
Space velocity: 1.0 volume propylene per hour per volume catalyst
Reactant ratio: 15.0 moles water per mole propylene

| Temperature, °F. | Conversion of Propylene—Mole Percent | | | | |
|---|---|---|---|---|---|
| | Isopropyl Alcohol | Acetone | Propane | Isopropyl Ether | Polymer |
| 250 | 2 | 0 | 0 | 0 | 0 |
| 275 | 3 | 0 | 0 | 0 | 0 |
| 300 | 7 | 0 | 0 | 0 | 0 |
| 325 | 17 | 0 | 0 | 0 | 0 |
| 340 | 26 | 0 | 0 | 0 | 0 |
| 375 | 47 | 4 | 1 | 1 | 3 |
| 400 | 51 | 6 | 4 | 3 | 7 |
| 425 | 50 | 7 | 8 | 2 | 12 |
| 450 | 43 | 10 | 12 | 2 | 14 |
| 475 | 34 | 12 | 16 | 1 | 18 |
| 500 | 22 | 16 | 20 | 1 | 23 |
| 525 | 8 | 20 | 27 | 0 | 28 |

As shown in Table 1, at temperatures of less than 340° F. the only product is isopropyl alcohol, but the yields are low, being less than 30 percent. As the temperatures are increased, the conversion of olefin to alcohol increases to a maximum of 51 percent at 400° F. At temperatures over 340° F., however, there is a concomitant production of acetone, propane, isopropyl ether and propylene polymer which increases as the temperature increases. However, the amounts of these materials compared to the desired alcohol product are not great at temperatures below about 450° F. Based upon the test results of Table 1, the overall temperature range for the catalyst employed should be about 250° F. to 600° F., with a preferred range of 325° F. to 500° F., and a most preferred range of 375° F. to 450° F.

Table 2 illustrates the use of another group VI metal sulfide catalyst for the hydration of olefins. This table shows the results achieved by employing a molybdenum disulfide catalyst for the hydration of propylene.

TABLE 2

*Effect of Temperature on Product Distribution in Reaction of Propylene and Water Over Molybdenum Disulfide Catalyst*

Pressure: 3675 pounds per square inch gauge
Space velocity: 1.0 volume propylene per hour per volume catalyst
Reactant ratio: 15.0 moles water per mole propylene

| Temperature, ° F. | Conversion of Propylene—Mole Percent ||||
|---|---|---|---|---|
| | Isopropyl Alcohol | Acetone | Propane | Polymer |
| 360 | 24 | 10 | 8 | 0 |
| 380 | 33 | 15 | 17 | 1 |
| 400 | 36 | 20 | 29 | 2 |
| 420 | 35 | 22 | 22 | 4 |
| 440 | 29 | 25 | 24 | 5 |
| 460 | 19 | 25 | 28 | 7 |
| 480 | 13 | 26 | 30 | 10 |
| 500 | 8 | 28 | 37 | 12 |
| 520 | 5 | 29 | 45 | 13 |

Table 2 indicates the overall temperature range for the catalyst employed should be about 250° F. to 600° F. with a preferred range of 325° F. to 500° F. and a most preferred range of about 375° F. to 450° F.

Table 3 illustrates the effect of temperature in the hydration of olefins employing a group VIII metal catalyst. As shown in Table 3, cobalt sulfide was employed to hydrate propylene to isopropyl alcohol.

TABLE 3

*Effect of Temperature on Product Distribution in Reaction of Propylene Over Cobalt Sulfide Catalyst*

Pressure: 3675 pounds per square inch gauge
Space velocity: 1.0 liquid volume propylene per hour per volume catalyst
Reactant ratio: 15.0 moles of water per mole of propylene

| Temperature, ° F. | Conversion of Propylene—Mole Percent ||||
|---|---|---|---|---|
| | Isopropyl Alcohol | Acetone | Propane | Polymer |
| 350 | 1 | 1 | 1 | 0 |
| 400 | 4 | 1 | 1 | 0 |
| 450 | 11 | 2 | 1 | 0 |
| 500 | 24 | 4 | 4 | 2 |
| 520 | 33 | 10 | 5 | 10 |

As indicated in Table 3, group VIII metal sulfide catalysts exhibit optimum conversion characteristics at temperatures higher than those shown for catalysts comprising group VI metal sulfides. According to Table 3, the preferred temperature range for the catalyst employed appears to be 450° F. to 600° F.

Table 4 illustrates the conversion to the alcohol of propylene when employing a mixture of group VI metal sulfide and group VIII metal sulfide as a catalyst. The catalyst employed in Table 4 was a cobalt-tungsten sulfide. This catalyst was essentially a mixture of tungsten disulfide and cobalt sulfide having the empirical formula:

$$WS_2 \cdot CoS_{1.14}$$

TABLE 4

*Effect of Temperature on Product Distribution and Reaction of Propylene and Water Over Cobalt Tungsten Sulfide Catalyst*

Pressure: 3675 pounds per square inch gauge
Space velocity: 1.0 liquid volume propylene per hour per volume catalyst
Reactant ratio: 15.0 moles of water per mole of propylene

| Temperature, ° F. | Conversion of Propylene—Mole Percent ||||
|---|---|---|---|---|
| | Isopropyl Alcohol | Acetone | Propane | Polymer |
| 350 | 7 | 1 | 1 | 0 |
| 400 | 31 | 3 | 2 | 10 |
| 450 | 27 | 9 | 5 | 25 |
| 500 | 23 | 19 | 17 | 20 |
| 520 | 17 | 27 | 25 | 13 |

Table 4 indicates that the optimum temperature when employing a mixture of a group VI metal sulfide and a group VIII metal sulfide as a catalyst is about mid-way between the optimum temperatures required for the individual metal sulfides. As shown in Table 4 the preferred temperature range for the catalyst employed is 375° F. to 520° F.

Table 5 illustrates temperatures employed when another group VI metal sulfide-group VIII metal sulfide catalyst mixture was employed for the hydration of an olefin. The catalyst employed in obtaining the data shown in Table 5 possessed the empirical formula:

$$MoS_2 \cdot CoS_{1.23}$$

TABLE 5

*Effect of Temperature on Product Distribution and Reaction of Propylene and Water Over Cobalt Molybdenum Sulfide Catalyst*

Pressure: 3675 pounds per square inch gauge
Space velocity: 1.0 liquid volume propylene per hour per volume catalyst
Reactant ratio: 15.0 moles of water per mole of propylene

| Temperature, ° F. | Conversion of Propylene—Mole Percent ||||
|---|---|---|---|---|
| | Isopropyl Alcohol | Acetone | Propane | Polymer |
| 350 | 12 | 1 | 1 | 0 |
| 400 | 23 | 5 | 3 | 0 |
| 450 | 28 | 14 | 10 | 5 |
| 500 | 22 | 24 | 28 | 3 |
| 520 | 14 | 29 | 36 | 1 |

The data presented in Table 5 again show that when a mixture of a group VI metal sulfide and a group VIII metal sulfide is employed as a hydration catalyst, the optimum temperature for alcohol formation falls about midway between the optimum temperatures which were indicated when a group VI metal sulfide catalyst was used alone and when a group VIII metal sulfide catalyst was used alone. The data in Table 5 indicate a preferred temperature range for the catalyst employed of 375° F. to 520° F.

Table 6 illustrates test results comparing the conversion of propylene with tungsten disulfide at space velocities varying from 0.8 to 1.4 liquid volumes of propylene per hour per volume of catalyst. Table 6 indicates results obtained using a tungsten disulfide catalyst at 400° F. and at 520° F.

Table 6

Hydration of Propylene at Various Temperatures and Space Velocities

Conditions:
    3675 pounds per square inch gauge
    15.0 moles water per mole propylene

| Propylene Space Velocity—Liquid Volumes per Hour per Volume Catalyst | Propylene Conversion—Mole Percent ||||||||
|---|---|---|---|---|---|---|---|---|
| | Tungsten Disulfide, 400° F. |||| Tungsten Disulfide, 520° F. ||||
| | Isopropyl Alcohol | Acetone | Propane | Polymer | Isopropyl Alcohol | Acetone | Propane | Polymer |
| 0.8 | 59 | 7 | 1 | 6 | 9 | 20 | 27 | 33 |
| 0.9 | 55 | 6 | 1 | 6 | 10 | 19 | 26 | 30 |
| 1.0 | 51 | 6 | 1 | 6 | 11 | 19 | 25 | 28 |
| 1.1 | 50 | 6 | 1 | 6 | 12 | 19 | 23 | 26 |
| 1.2 | 48 | 6 | 1 | 6 | 13 | 18 | 23 | 24 |
| 1.3 | 47 | 6 | 1 | 6 | 14 | 18 | 21 | 23 |
| 1.4 | 46 | 6 | 1 | 6 | 15 | 18 | 20 | 22 |

At all the space velocities indicated, tungsten sulfide produces better conversions of propylene to isopropyl alcohol at 400° F. than at 520° F. In addition to the high conversions achieved, small but useful amounts of easily separable by-products such as acetone and polymer are obtained when the sulfide catalyst is employed at the lower temperatures as compared to the excessive quantities of these by-products produced at the higher temperature. It is seen from Table 6 that at the 400° F. temperature there is a general decrease in the production of alcohol with increasing space velocity, but the amount of acetone, propane and polymer produced was substantially constant over the space velocity range explored. The space velocity to be used will depend upon the highest space-time yield of alcohol obtainable. Space velocities of between 0.25 and 20 are suitable for this reaction, but it is preferred that the space velocity be between 0.75 and 5.

The rapid deactivation of the catalysts of this invention at high temperatures is probably due to the fact that these catalysts lose their sulfur content at a relatively rapid rate at high temperatures. The transition of the sulfide catalysts of this invention from the sulfide form to the non-sulfide form at high hydration temperatures is substantiated by chemical analyses of fresh and used catalysts. Chemical analysis of fresh and used catalysts discloses the extent to which the chemical composition of the catalyst is changed during high temperature hydration. For example, a test was conducted employing a tungsten disulfide catalyst for the hydration of propylene at 520° F., 3675 pounds per square inch gauge, a space velocity of 1 volume liquid propylene per hour per volume of catalyst and a reactant ratio of 15 moles of water per mole of propylene. The approximate empirical formula of the fresh catalyst was $WS_{1.74}$ as compared to an empirical formula of $WS_{0.71}O_{1.61}$ after a total throughput of 90 liquid volumes of propylene per volume of catalyst. It is accordingly seen that when a tungsten disulfide catalyst is employed at 520° F. it tends to lose its sulfur content and become converted during the course of the hydration reaction from the sulfide to the oxide form.

It has been discovered that the transition from the sulfide to the oxide form when employing the catalysts of this invention at 520° F. is substantially diminished by employing these catalysts at lower temperatures. As indicated above, from the viewpoint of conversion, the optimum temperature for the use of the tungsten sulfide catalyst of this invention is 400° F. The data in Table 7 illustrate the aging effects on this catalyst when it is employed at this temperature. In obtaining the data of Table 7, fresh tungsten disulfide catalyst was charged to a reactor and a long throughput experiment was made at 400° F., 3675 pounds per square inch gauge, 1.0 liquid volumes of propylene per hour per volume of catalyst and a 15:1 water to olefin mole ratio.

Table 7

Effect of Throughput on Product Distribution in Reaction of Propylene and Water Over Tungsten Disulfide Catalyst Catalyst: Fresh at start of tests. Nonpreconditioned by use at low e temperatures
Temperature: 400° F.
Pressure: 3675 pounds per square inch gauge
Space velocity: 1.0 volume propylene per hour per volume catalyst
Reactant ratio: 15.0 moles water per mole propylene

| Throughout Liquid Volumes Propylene Per Volume Catalyst | Conversion of Propylene—Mole Percent ||||
|---|---|---|---|---|
| | Isopropyl Alcohol | Acetone | Propane | Polymer |
| 25 | 39 | 10 | 10 | 9 |
| 50 | 38 | 9 | 10 | 1 |
| 100 | 38 | 8 | 8 | 0 |
| 150 | 37 | 7 | 7 | 0 |
| 200 | 37 | 6 | 6 | 0 |
| 250 | 36 | 5 | 5 | 0 |

As shown in Table 7, the initial isopropyl alcohol yield of 39 mole percent decreases only slightly over a 250 throughput interval, the propane-acetone production decreases about 50 percent, and the polymer production disappears after only about a 50 throughput interval.

The data in Table 8 indicate the extent of catalyst deactivation when employing a mixture of a group VI metal sulfide and a group VIII metal sulfide as a catalyst. As indicated above, the optimum hydration temperature for this catalyst is approximately 460° F. and the throughput data shown in Table 8 were obtained at this temperature.

Table 8

Effect of Throughput on Product Distribution and Reaction of Propylene and Water Over Molybdenum Cobalt Sulfide Catalyst Catalyst: Fresh at start of test. Non-preconditioned by use at lower temperatures
Temperature: 460° F.
Pressure: 3675 pounds per square inch gauge
Space velocity: 1.0 liquid volume propylene per hour per volume catalyst
Reactant ratio: 15.0 moles of water per mole of propylene

| Throughout Liquid Volumes Propylene Per Volume Catalyst | Conversion of Propylene—Mole Percent ||||
|---|---|---|---|---|
| | Isopropyl Alcohol | Acetone | Propane | Polymer |
| 10 | 26 | 16 | 15 | 3 |
| 20 | 25 | 14 | 15 | 0 |
| 30 | 24 | 14 | 15 | 0 |
| 40 | 24 | 12 | 14 | 0 |
| 50 | 24 | 11 | 14 | 0 |

As shown in Table 8 the 460° F. reaction temperature was sufficiently low so that in the throughput interval from 10 to 50 liquid volumes propylene per volume catalyst the conversion of isopropyl alcohol decreased only from 26 percent to 24 percent.

It has been found that the sulfide catalysts of this invention are further improved in respect to both olefin conversion and catalyst aging by means of preconditioning the catalyst by initial use at temperatures below the hydration temperature range of this invention. For best results, the preconditioning of the catalyst should be carried out at a temperature of 100° to 250° F. for a duration of 1 to 50 volumes of liquid olefin charge per volume of catalyst. The improvement of the sulfide catalysts of this invention by low temperature preconditioning is illustrated by the data in Table 9. The data of Table 9 was obtained by using a catalyst which was preconditioned at a temperature of approximately 250° F. before the start of the tests illustrated in the table.

TABLE 9

*Effect of Throughput on Product Distribution in Reaction of Propylene and Water Over Tungsten Disulfide Catalyst*

Catalyst: Preconditioned by use for a period of time at a temperature of about 250° F. before start of these tests
Temperature: 400° F.
Pressure: 3675 pounds per square inch gauge
Space velocity: 1.0 liquid volume propylene per hour per volume catalyst
Reactant ratio: 15.0 moles water per mole propylene

| Throughput Liquid Volumes Propylene per Volume Catalyst | Conversion of Propylene—Mole Percent | | | | |
|---|---|---|---|---|---|
| | Isopropyl Alcohol | Acetone | Propane | Isopropyl Ether | Polymer |
| 10 | 51 | 8 | 5 | 3 | 3 |
| 20 | 51 | 8 | 5 | 3 | 4 |
| 30 | 51 | 7 | 5 | 3 | 4 |
| 40 | 51 | 7 | 5 | 3 | 4 |
| 50 | 51 | 7 | 5 | 3 | 4 |
| 60 | 51 | 6 | 4 | 3 | 4 |

Table 9 shows that when a catalyst is preconditioned by use at a lower temperature and then employed at 400° F., substantially no aging occurs over the throughput range indicated. In addition, the conversion of olefin to alcohol is higher when the preconditioned catalyst of Table 9 is employed as compared to the use of a similar non-preconditioned catalyst.

The effect of pressure upon the hydration of olefins employing the catalysts of this invention is not critical. Whatever pressure is employed must be high enough to at least partially maintain the water in the liquid state, thereby favoring the formation of the alcohol. At pressures below 2000 pounds per square inch gauge the yields of alcohol and all by-products, especially the yields of saturates and polymers, are decreased. However, at hydration temperatures close to 400° F. the yields of saturates are small even at the higher pressures. A range of about 500 to 5000 pounds per square inch gauge or more can be used, with the preferred range being 1500 to 4000 pounds per square inch gauge.

The conversion of propylene to alcohol increases as the water to olefin ratio increases, but the amounts of polymer, propane and acetone remain fairly constant. The optimum water to olefin ratio will depend on the economics of circulating the additional water versus the benefit of increasing the conversion of olefin to alcohol. A water to olefin ratio of 15:1 has been found to give both good conversions and reasonable concentrations of alcohol in the product solution. The water to olefin ratio can vary from about 1:1 to 40:1 or more, but the preferred range is 5:1 to 20:1.

The liquid products from the tests made in accordance with this invention consist of two phases, an aqueous phase containing the alcohol and other oxygenated products, plus a hydrocarbon phase. Analysis shows that the hydrocarbon phase product is a polymer of propylene. This hydrocarbon polymer was distilled into a gasoline range fraction and heavier fractions. Most of the hydrocarbon polymer product, 88.4 percent by volume, was in the gasoline boiling range with practically all the remainder in the range 400° to 625° F. The properties of these fractions are shown in Table 10.

TABLE 10

*Properties of Hydrocarbon Polymer From Hydration of Propylene Over Tungsten Disulfide Catalyst*

| | |
|---|---|
| Total liquid product: Gravity, ° API | 56.9 |
| True boiling distillation of liquid product: | |
| IBP—400° F. fraction— | |
| Yield, percent by volume | 88.4 |
| Gravity, ° API | 59.7 |
| Sulfur, percent | 1.93 |
| Hydrocarbon type (FIA), percent by volume: | |
| Aromatics | 9.0 |
| Olefins | 74.5 |
| Saturates | 16.5 |
| Bromine No. ASTM D1159 | 115.9 |
| Knock rating, ASTM D908: | |
| Research Method: | |
| Octane No. (micro) clear | 92.0 |
| +3.0 cc. TEL/gal. | 92.0 |
| 400° to 625° F. fraction— | |
| Yield, percent by volume | 9.9 |
| Gravity, ° API | 40.6 |
| Sulfur, percent | 1.08 |
| Hydrocarbon type (FIA), percent by volume: | |
| Aromatics | 5.8 |
| Olefins | 92.2 |
| Saturates | 2.0 |
| Bromine No. ASTM D1159 | 70.2 |
| 625° F. residue: Yield, percent by volume | 1.7 |

As shown in Table 10, the octane number of the gasoline is 92 research clear. Hydrogenation of the gasoline polymer can remove much of the sulfur content, saturate a portion of the olefins and produce a branched, stable product of reasonably high octane number.

The catalysts and process of this invention can be applied to the hydration of any olefin such as aliphatic or cyclic monoolefins or diolefins or to internal olefins. The catalysts and process of this invention can likewise be applied to the hydration of olefins such as aromatics or naphthenes with unsaturated side chains such as vinylbenzene or methylene cycloheptane. In addition to low molecular weight aliphatic olefins, this invention can also be applied to the hydration of both normal and iso high molecular weight olefins. Examples of such olefins are pentene, heptene, undecene, dodecene, hexadecene, octadecene, nonadecene, etc.

Although the catalysts of this invention possess highly superior aging characteristics, any decrease in hydration activity due to loss of sulfur from the catalyst can be compensated for by the injection of a sulfur containing material into the reactor. This injection can be intermittent or continuous and can proceed during the course of the reaction. Examples of sulfur containing materials suitable for this purpose are hydrogen sulfide, ammonium sulfide, ethyl sulfide, propyl mercaptan, etc.

EXAMPLE 1

A mixture of 50 percent butene-1 and 50 percent butene-2 was passed over a tungsten disulfide catalyst at a temperature of 400° F., a pressure of 3675 pounds per square inch gauge, a space velocity of 1.0 liquid volume of olefin per hour per volume of catalyst and a ratio of 15.0 moles of water per mole of olefin. A substantial yield of secondary butyl alcohol was produced.

EXAMPLE 2

A propylene-water mixture containing propylene and water in a 20:1 mole ratio is charged to a hydration reactor containing an iron sulfide-chromium sulfide catalyst. The mole ratio of iron to chromium is 2:1 and the sulfur content of the catalyst is 40 percent. A reaction temperature of 400° F., a reaction pressure of 3500 pounds per square inch gauge and a space velocity of 2 volumes propylene per hour per volume of catalyst are employed. High yields of isopropyl alcohol together with small acetone and polymer yields are achieved.

EXAMPLE 3

A mixture of octene-1 and water in a mole ratio of 10:1 is passed over a nickel sulfide catalyst at 375° F., 3700 pounds per square inch gauge and a space velocity of 1 volume octene-1 per hour per volume of catalyst. A product containing 2-octanol is recovered.

Various changes and modifications may be made without departing from the spirit of this invention and the scope thereof as defined in the following claims.

We claim:

1. A process for the hydration of olefin to alcohol comprising continuously passing olefin together with water in a water to olefin molal ratio between 1:1 and 40:1, said water being at least partially in the liquid phase, over a catalyst comprising the sulfide of at least one metal selected from the group consisting of group VI and group VIII metals at a temperature between 100° F. and 250° F. and a pressure of 500 to 10,000 pounds per square inch gauge for a throughput interval corresponding to the passage of from 1 to 50 liquid volumes of olefin per volume of catalyst, thereupon continuously passing over said catalyst olefin together with water which is at least partially in the liquid phase at a temperature of 325° F. to 600° F., a pressure of 500 to 10,000 pounds per square inch gauge and a water to olefin molal ratio between 1:1 and 40:1.

2. A process for the hydration of olefin to alcohol comprising continuously passing olefin together with water in a water to olefin molal ratio of 1:1 to 40:1, said water being at least partially in the liquid phase, over a sulfide of tungsten catalyst at a temperature between 100° F. and 250° F. and a pressure of 500 to 10,000 pounds per square inch gauge for a throughput interval corresponding to the passage of from 1 to 50 liquid volumes of olefin per volume of catalyst, thereupon continuously passing over said catalyst olefin together with water which is at least partially in the liquid phase at a temperature of 325° F. to 500° F., a pressure of 500 to 10,000 pounds per square inch gauge and a water to olefin molal ratio between 1:1 and 40:1.

3. A process for the hydration of olefin to alcohol comprising continuously passing olefin together with water in a water to olefin molal ratio between 1:1 and 40:1, said water being at least partially in the liquid phase, over a catalyst comprising the sulfide of at least one metal selected from the group consisting of group VI and group VIII metals at a temperature between 100° F. and 250° F. and a pressure of 500 to 10,000 pounds per square inch gauge for a throughput interval corresponding to the passage of from 1 to 50 liquid volumes of olefin per volume of catalyst, thereupon continuously passing over said catalyst olefin together with water which is at least partially in the liquid phase at a temperature of 375° F. to 520° F., a pressure of 500 to 10,000 pounds per square inch gauge and a water to olefin molal ratio between 1:1 and 40:1, and continuing passing said olefin and water over said catalyst for a throughput interval corresponding to the passage of at least 50 liquid volumes of olefin per volume of catalyst.

References Cited in the file of this patent

UNITED STATES PATENTS

| | | |
|---|---|---|
| 1,999,620 | Van Peski et al. | Apr. 30, 1935 |
| 2,435,380 | Archibald et al. | Feb. 3, 1948 |
| 2,635,119 | Finch et al. | Apr. 14, 1953 |

UNITED STATES PATENT OFFICE
CERTIFICATE OF CORRECTION

Patent No. 3,129,253                        April 14, 1964

Raymond C. Odioso et al.

It is hereby certified that error appears in the above numbered patent requiring correction and that the said Letters Patent should read as corrected below.

Column 2, line 14, for "25 volumes" read -- 20 volumes --; column 3, TABLE 2, fourth column, line 3 thereof, for "29" read -- 19 --; column 4, TABLE 4, second column, line 2, thereof, for "31" read -- 21 --.

Signed and sealed this 15th day of September 1964.

(SEAL)
Attest:

ERNEST W. SWIDER                        EDWARD J. BRENNER
Attesting Officer                         Commissioner of Patents